US007152792B2

(12) United States Patent
Gaston

(10) Patent No.: US 7,152,792 B2
(45) Date of Patent: Dec. 26, 2006

(54) VOTING APPARATUS AND METHOD USING PERSONAL COMPUTERS

(76) Inventor: Charles A. Gaston, 2381 Lititz Pike, Lancaster, PA (US) 17601

(*) Notice: Subject to any disclaimer, the term of this patent is extended or adjusted under 35 U.S.C. 154(b) by 1167 days.

(21) Appl. No.: 10/078,172

(22) Filed: Feb. 19, 2002

(65) Prior Publication Data

US 2003/0040956 A1 Feb. 27, 2003

Related U.S. Application Data

(60) Provisional application No. 60/282,344, filed on Apr. 9, 2001, provisional application No. 60/282,345, filed on Apr. 9, 2001, provisional application No. 60/282, 346, filed on Apr. 9, 2001.

(51) Int. Cl.
*G06K 17/00* (2006.01)
*G07C 13/00* (2006.01)
*G06F 11/00* (2006.01)

(52) U.S. Cl. .......................... 235/386; 235/51; 705/12

(58) Field of Classification Search ................ 235/386, 235/51, 50 R, 50 A, 50 B; 705/12
See application file for complete search history.

(56) References Cited

U.S. PATENT DOCUMENTS

| | | | | |
|---|---|---|---|---|
| 3,790,072 | A * | 2/1974 | Moldovan, Jr. | 235/50 R |
| 4,010,353 | A * | 3/1977 | Moldovan, Jr. et al. | 235/54 F |
| 4,641,240 | A | 2/1987 | Boram | 364/409 |
| 4,641,241 | A | 2/1987 | Boram | 364/409 |
| 4,774,665 | A * | 9/1988 | Webb | 705/12 |
| 4,907,111 | A | 3/1990 | Derman | 360/97.02 |
| 4,918,952 | A | 4/1990 | Lakoski et al. | 70/57 |
| 5,218,528 | A | 6/1993 | Wise et al. | 364/409 |
| 5,355,272 | A | 10/1994 | Kung | 360/137 |
| 5,377,099 | A * | 12/1994 | Miyagawa | 705/12 |
| 5,583,329 | A | 12/1996 | Davis, III et al. | 235/50 A |
| 5,630,330 | A | 5/1997 | Kung | 70/58 |
| 5,878,399 | A | 3/1999 | Peralto | 705/12 |
| 6,250,548 | B1 | 6/2001 | McClure et al. | 235/51 |
| 2002/0066780 | A1* | 6/2002 | Balolia | 235/51 |
| 2004/0016802 | A1* | 1/2004 | Cummings | 235/386 |
| 2004/0024635 | A1* | 2/2004 | McClure et al. | 705/12 |
| 2004/0046021 | A1* | 3/2004 | Chung | 235/386 |
| 2004/0195323 | A1* | 10/2004 | Vadura et al. | 235/386 |
| 2005/0218224 | A1* | 10/2005 | Boldin | 235/386 |

* cited by examiner

*Primary Examiner*—Jared J. Fureman
(74) *Attorney, Agent, or Firm*—Martin Fruitman

(57) ABSTRACT

The disclosure is for an apparatus and method for voting that are based on personal computers. All data and software, including the operating system, voting software, and original ballot information are on a single portable data storage medium, such as a diskette. During use, voting results and security-check information are added to the same portable storage medium. The apparatus also includes a tamper detectable seal for a diskette in the computer and means for officials to authorize each voter to begin voting. In one sealing system diskette removal is prevented by a blocking plate that slides into the diskette slot above the diskette and an extension fastened to the diskette is also attached to the blocking plate assuring that the diskette cannot be removed until a visible seal is broken.

20 Claims, 10 Drawing Sheets

FIG. 8
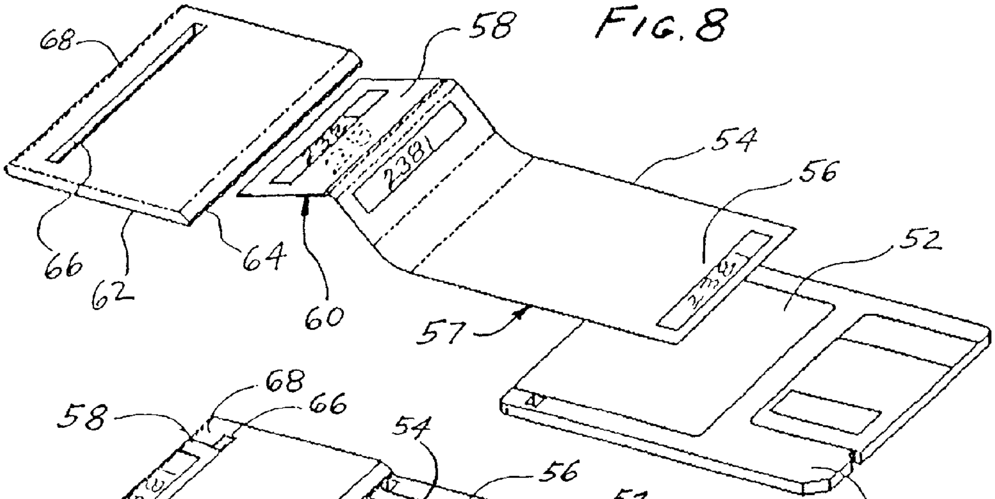
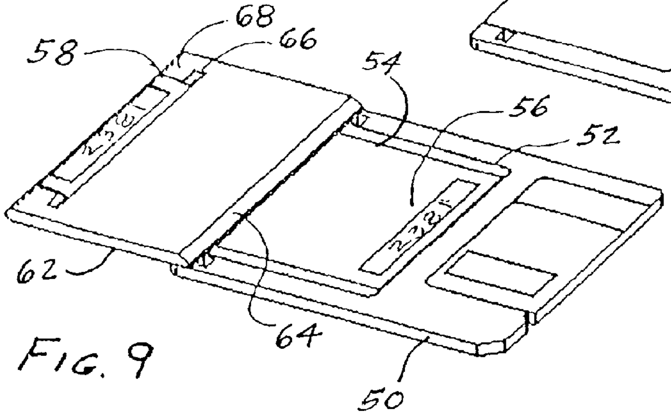
FIG. 9
FIG. 10
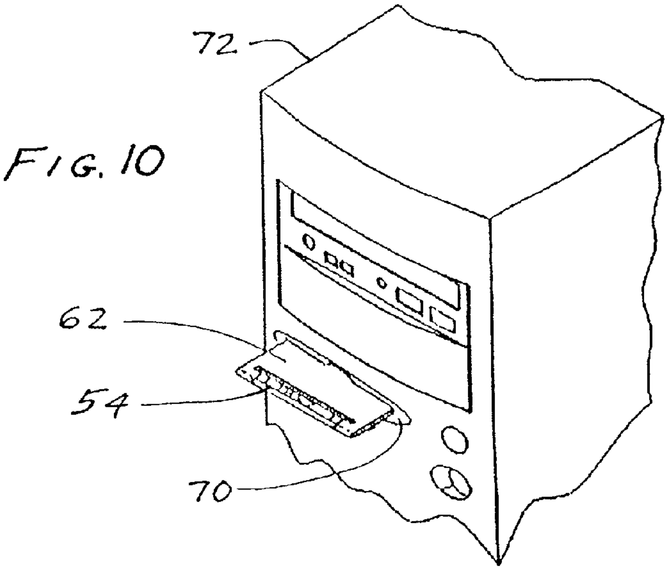

VOTING APPARATUS AND METHOD USING PERSONAL COMPUTERS

This application is based upon provisional applications Ser. No. 60/282,344, filed Apr. 9, 2001; Ser. No. 60/282,345, filed Apr. 9, 2001; and Ser. No. 60/282,346, filed Apr. 9, 2001.

BACKGROUND OF THE INVENTION

This invention deals generally with voting systems and more specifically with a computerized voting system based upon and using inexpensive, generally available, personal computers.

The presidential election of 2000 November revealed to the general public the inadequacy and inaccuracy of most existing voting systems. Electronic voting systems have been proposed as a solution to the problems experienced. Such electronic systems generally provide very good accuracy and security, but usually are expensive because they are highly specialized and very complex. In fact, many such voting systems are custom designed computers so that even the initial construction and installation costs are prohibitive. It would be very beneficial to establish a computerized voting system based on conventional personal computers. Such computers, particularly if they need not be the latest, high speed, units, could be inexpensive enough for the poorest districts to afford without massive subsidies, and might even be available at no cost, while providing accuracy and security at least as good as any other direct recording equipment.

SUMMARY OF THE INVENTION

The present invention provides an electronic voting system based on ordinary, readily available personal computers and provides a direct recording voting system that can expose all system information to public scrutiny, minimizing the possibility of computer fraud. The invention provides a computer based voting system that keeps the operating system, voting software, ballot templates, voting results and all related information on a single conventional diskette. The invention provides voting system software that uses a simple word processing file to define and display the ballot, with the ballot-determining file being created from paper sources by manual typing or from computer readable data by any appropriate software.

The invention also includes software and a ballot format that accommodates primaries, general elections, straight-party and individual votes, candidates, questions, selections, and write-ins. Furthermore, it provides reliable protection of voting records by recording all votes in at least three places. The invention also prevents fraudulent voting by requiring voting officials to unlock the system for each voter using a physically controllable device to provide an input signal to the software.

Tampering is prevented by sealing a portable data storage medium into the computer and by maintaining a time stamp log file that can reveal any interruption of normal operation, such as the removal of the portable storage medium. Redundant checks are also included, wherever practical, to assure that hardware, software, data files and procedures all are correct. Moreover, the invention minimizes voter confusion by presenting a single office or issue at a time to the voter, and by using a minimum of distinct keys to control the voting process.

The invention also assures correct recording of voter intent by not allowing overvotes, by warning of undervotes, by permitting review and modification of all the voter's choices before finalizing them, and by showing a compact summary of the individual voter's ballot status whenever room is available on the monitor screen.

With perhaps some very unusual exceptions, any IBM-style personal computer made in the past dozen years can be started up from a 3.5" diskette. This also may be true of non-IBM computers (such as those made by Apple). Unfortunately, with some recent operating systems, disconnection of the hard drive(s) may be necessary in order to boot from a portable storage medium such as a diskette, but that modification is relatively simple and easily reversible. When a computer is booted from the diskette provided for use with the invention, the contents of that one diskette control all the functions of the computer.

The present invention provides an integrated combination of an operating system, executable programs, ballot templates, and vote recording data files on a single diskette. Since it also includes means for indicating tampering with the diskette within its drive and means for voting officials to authorize each individual voter, this invention turns a commonly-available personal computer into a secure direct-recording voting station.

The means for indicating tampering with the diskette within its drive can be as simple and direct as a lockable box capable of enclosing the computer system unit, a lockable cover attached to the computer case that prevents access to the diskette drive, or an adhesive seal placed across the diskette drive opening. However, the preferred embodiment is a direct attachment to the diskette, described herein and suitable for use with any 3.5" diskette drive. It is simple, compact, requires no modification of the computer, and also uniquely identifies the diskette being used. Computer hardware may be designed so that it can be booted up and completely controlled by the contents of some different, easily copied, portable storage medium other than a magnetic disk. With such other devices a different tamper indicating device may be required, but the present invention will still be pertinent with such different components.

The means for voting officials to authorize each new voter can be a device connected to a serial, parallel, or mouse port. It can also be a device connected to the keyboard port in tandem with the normal keyboard. It can even be a mechanical device with a lock that covers some portion of the keyboard. The important feature is that it be physically controllable by election officials to prevent tampering by anyone else. The preferred embodiment is a "permission box" connected by cable to the serial port of the computer and is described in detail later. The preferred embodiment of the permission box provides one input button and two output LEDs to indicate system status.

A very important feature of the present invention is that it disables any keyboard features that would allow the program to be interrupted. Automatic key repetition, which might confuse voters, also is disabled.

The benefit of allowing public scrutiny of the election process depends mainly upon procedures for use of the system rather than upon the executable programs. To accomplish this benefit of exposing all system information to public scrutiny the following steps, all but the first done publicly, would be followed.

1. Create multiple identical copies of the single diskette to be used at a voting precinct.

2. Select at random a diskette to become the "official" diskette, and distribute other copies to interested groups such as news organizations and political parties.
3. Seal the official diskette into the voting computer and conduct voting.
4. After closing the polls, but before unsealing the diskette, print and distribute multiple copies of the tabulated voting results.
5. Make and distribute multiple copies of the official diskette, which now includes all the voting results.

If these steps are followed, it becomes virtually impossible to have any behind-the-scenes manipulation of the results. If it is considered undesirable to release results before other polls have closed, printouts and final diskettes may need to be secured in some tamper-resistant way for distribution later. The use of a police evidence bag is one possibility.

The present invention has a great many advantages. The invention is inherently more secure than any other voting system in use. Other systems provide multiple opportunities for insider manipulation. In the present invention, nothing is hidden except the individual voters' selections. There is no "single copy" of individual ballots or compiled results that is vulnerable to tampering or needs to be protected. Even the computer source code can be made public, and can be tested on anyone's computer.

The invention is inherently more accurate than most other voting systems. Any system allowing human input on a continuum (markings from a single dot to a huge smear; pressure from zero to the breaking point; etc.) will produce votes that can be interpreted in more than one way. Any system that involves human transcription of results is subject to errors. Any system that requires matching information to be entered twice (once for the printed ballot, once for controlling the corresponding switches) is open to mismatches. Except for the spelling of write-in names, the present invention leaves nothing open to interpretation. There is no need for manual counting or transcription of results; all results are in a text file on an ordinary diskette. That file can be printed, displayed or read by any type of tallying program to combine results from multiple stations. There is a single source of ballot data—a simple text file, and voting results are stored as a copy of that ballot file with zeroes changed to vote totals. There is virtually no possibility of a mismatch between what the voter sees and how votes are tallied on the diskette. All the known potential error sources of other systems have been eliminated.

The invention is less expensive than any other system in use . . . with the possible exception of hand-counted paper ballots in a very small district. Other electronic systems require expensive special-purpose hardware. Even the cheapest mechanical punched-card systems have high printing costs. The present invention has only minor hardware additions to a standard computer, and no significant consumables because diskettes are ultimately reusable.

The present invention is easier to use than most other voting systems. Current systems that present candidates' names on paper, including the mechanical lever machines and several modern electronic systems, generally require decisions on how to lay things out in two dimensions. The infamous Florida "butterfly ballot" is a case in point. The present invention uses a straightforward linear scheme, requiring decisions only on the sequence of presenting different offices and candidates. Since only one office or question is presented at a time, the invention also is less confusing for the voter. Counting also is easier, because even write-ins are recorded on the diskette, and all summaries can be done automatically.

Write-ins are integrated into the normal voting process. Instead of requiring a distinctly separate approach to voting, any name added by a voter by typing it in effectively becomes just another in the list of candidates for that office. Until that voter finishes, a vote for the write-in is just like a vote for any other candidate on the ballot. It can be changed; it is counted just the same in calculating the total number of votes allowed for that office; etc. Where write-ins are inappropriate or illegal, that ballot item can be flagged so that the software does not allow write-ins.

The present invention may be the only electronic direct-recording voting station that does not require any specialized central system hardware or immediate change to existing manual data entry. It can be used for local elections where all voting is done on a single machine, such as with many New York school board elections. It can directly replace existing mechanical lever machines with very little change in procedures. At any feasible time, simple software can be created to read the diskette data directly into whatever database system is being used, bypassing manual entry. The transition can be progressive, as time and budget allow.

Ballot size is virtually unlimited. In Connecticut there was an election in which there were more than a hundred candidates for 88 council seats. The voting equipment in use could not handle this, so they were forced to use paper ballots. This caused a big problem for those trying to "vote for no more than 88", and an enormous problem for those trying to count those votes and verify compliance. With the present invention, large-field offices are handled by scrolling the complete list of candidates. The system also would handle 88 write-in votes, if someone wanted to do that.

The system accommodates independent/dependent voting. When voting in a presidential primary in Washington, D.C., one must first select a candidate, and then select electors for that candidate. This is not difficult to structure on a paper ballot, but it is very likely that many would misvote in such a situation. With the present invention, the dependent candidates (electors) cannot even be seen until the corresponding independent candidate has been selected.

The invention is extremely flexible because of the independence from hardware. Unlimited ballot size and independent/dependent voting described above were not part of the original software, but were added fairly easily when the need was discovered. There are limitations. Pictures and symbols are not an option. The present software limits the display to pure text, 80 characters wide by 25 lines high. This approach keeps ballot preparation simple, and also makes the software simpler and thus easier to check for proper performance.

The diskette-sealing mechanism of the preferred embodiment (paper label around plastic insert) not only provides evidence of any attempt to remove the ballot diskette during voting, it also marks the master diskette in a uniquely identifiable way.

The system allows all-inclusive ballot preparation, but presents to each voter only the offices for which that voter is allowed to vote. In primary elections, for instance, a paper ballot system requires different ballots for each possible party affiliation, and a mechanical lever machine shows all the candidates but locks out those of the other parties. The present invention allows a number of "voter types", and allows identifying which voter types may vote for each office or question. Types can correspond to parties, voting districts, etc. Two small districts could even vote at the same place on the same machine, but see some different offices, questions or candidates.

A "practice mode" skips some security features and allows voting on any computer. Practice computers (as many as desired) can be set up outside the polling place. The software even can be distributed on diskette or via the Internet for anyone to practice voting at home.

Virtually every article that talks about improving the country's voting systems projects enormous associated costs. In virtually every case switching to the present invention actually would save money. As one example, Lancaster County, Pa. pays $48,000 per year just to store the voting machines that will not fit in its own facilities.

The software used for the invention is so basic that it will even work on a 20MHz 386 computer with 4Mb of memory. No hard disk is required, and no mouse. Very few of the computers now going into dumpsters and recycling centers are too old to be usable.

Software operation can be verified by anyone who cares to check it. It could be made downloadable from a web site. The executable program is only about 200Kb, and the complete commented source code probably is less than 600Kb.

BRIEF DESCRIPTION OF THE DRAWINGS

FIG. 8 is a perspective exploded view of the preferred embodiment of the diskette sealing apparatus of the invention showing a blocking plate and a diskette with a flexible extension about to be attached.

FIG. 9 shows the components of FIG. 8 as assembled.

FIG. 10 shows the assembly of FIG. 9 as it appears when sealed within a typical diskette drive.

DETAILED DESCRIPTION OF THE INVENTION

Figure 1:
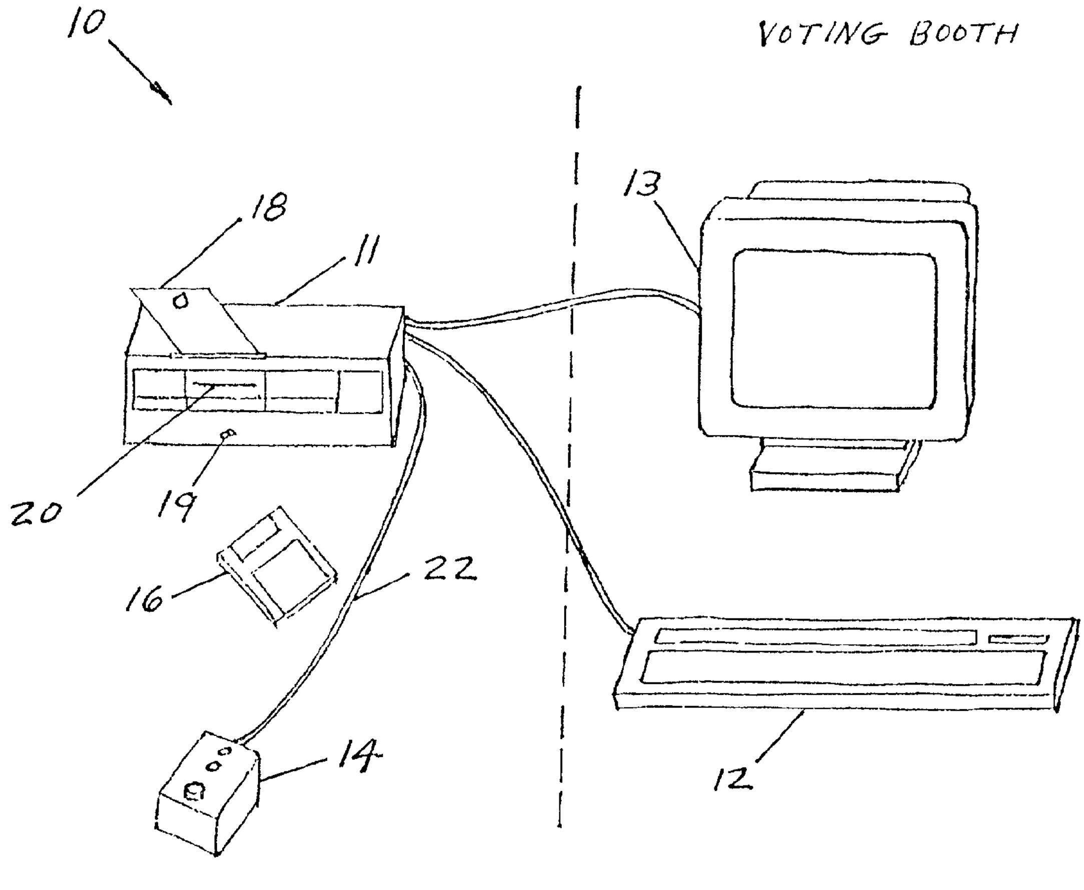
FIG. 1 is a perspective view of the four key components the voting station of the preferred embodiment of the invention.

FIG. 1 is a perspective view of the major components of the voting station of the preferred embodiment of the invention in which an ordinary personal computer 10 with central processing unit 11, keyboard 12, and monitor 13 provides computational power and the physical interface with the voter. Only keyboard 12 and monitor 13 are readily accessible to the voter within the voting booth. Permission box 14 is connected to a serial port of central processing unit 11 and provides the means for voting officials to communicate with and control computer 10. Permission box 14 is kept completely inaccessible to the voters. Diskette 16 contains the operating system, voting software, and ballot template before voting. After voting it also contains the voting results and security-check information.

Security device 18 is used to seal diskette 16 into diskette drive slot 20 of computer 10. Security device 18 shown in FIG. 1 is a simple hinged flap which covers the diskette drive slot 20 and seals it within the computer with lock 19. However, as described later, the security device can be any other device, including those directly associated with the diskette itself, which indicate if the diskette has been tampered with, and particularly if the diskette, or any other portable storage medium, has been disconnected from the computer.

The Examples which follow either are sample text files that determine sample ballots for typical elections, easily produced with a word processing program, or represent computer screens seen under various circumstances. Such a text file is produced in advance of the election and is added to diskette 16, which already includes the computer operating system and the master and supporting programs. The text file is interpreted by the master program to create the ballot seen by the voter on the voting screen of monitor 13, and a copy of that text file also creates a depository in which the vote totals are accumulated. Of course, such totals are not displayed on the voting screen, but they are retained on diskette 16 until all voting is completed. The production of such a text file is somewhat equivalent to setting up a mechanical voting machine, including printing the paper labels used to identify the various levers. Depending upon the size of the ballot, it is generally possible to put the ballot files for hundreds of voting districts on one diskette, allowing identical copies to be sent to all the affected voting districts, where the unneeded information can be erased.

In the preferred embodiment, certain special characters are used to identify parts of the text file which must be interpreted by and operated upon by the voting software. The text file is prepared as an ASCII file, and the file name's extension is .BAL. The file name is also made the first line of the text file as a redundancy check. In Example I below, the file name PRID13 is chosen to indicate a primary ballot for voting district 13.

Every significant line of the text file, lines that appear on the ballot screen, accumulate a vote count, or control the voting process must begin with one of the special characters described below. Blank lines to improve readability, programmer instructions, and comments may also appear in the text file, but are ignored by the computer. The blank lines more clearly separate different offices, and comments explain the ballot format for someone reading the results or creating a new ballot. The absence of a special character at the beginning of a line in the text file indicates the line is an instructional comment, of significance only to human readers, and it does not appear on the voting screen and has no affect on the operating program. Blank lines or comments are not permitted to interrupt a series of the same type of significant lines, but as many comments as desired may appear in a file.

The following special characters at the beginning of a line indicate the types of lines described.

@ identifies a line indicating one of two or more types of voter (such as Democratic or Republican) This feature is used to restrict certain ballot items to certain voter types, as is necessary in a primary election. This type of line includes the full-text description of this voter type, a unique single-character identifier, and a count field for showing the accumulated total of the number of voters of this type.

% identifies a line indicating a party name. This helps identify candidate affiliations easily, and permits straight-party voting.

{ identifies a line containing text that is shown on the voting screen to describe an office, issue or question. Such text can extend over multiple lines, but each line must begin with this same special character. With the repeated appearance of "{", the full text of an issue can be displayed. Since every line must begin with "{", even blank lines can be included. There are very good reasons for keeping the wording of a question brief, but hypothetically one question could nearly fill the screen. Exceptionally long office titles can extend to additional lines, as well.

} identifies the terminating line after a group of lines preceded by the previously discussed character, {. This terminating line may include codes indicating the number of votes allowed for the office, whether write-ins are allowed, and which type or types of voters may see and vote for this office or question.

0 identifies a line containing a vote-count field along with the associated candidate name (and party affiliation), or the vote count for the answers to a question.

Dashed lines are used on the text file examples below to separate out comments, but these lines do not appear on the voting screens. Furthermore, the last line of each .BAL file must be exactly like this: 0000 Votes Cast Before an election, all the count fields of a ballot file must be zero. After an election, a duplicate of the ballot file will be identical to the original, except that all the count fields will contain appropriate number totals.

Example I is a text file for a primary ballot with several comments for the people reading the results or developing new ballots. Example II is a text file for the same ballot as Example I, but nearly all the instructional comments have been removed. The voter would see no difference between the two versions during voting. Examples III–VII represent several of the screens seen by the voter during various voting situations. Example VIII shows the text file that determines a sample ballot for a general election, and Examples IX, X, and XI represent three of the screens seen by the voter during various voting situations using the ballot of Example VIII.

EXAMPLE I

```
--------------------------------------------------------------------------------
PRID13
COMMENT - Ballot for Precinct 13. "@" begins a line defining
a "type of voter". It is followed by an identifying
character, a place for a count: "(0000)", and the text to be
displayed. The text starts with the ninth character. Each
voter type will see only those offices and issues for which
that voter is allowed to vote. No two parties or voter types
may use the same identifying character. Case matters; "R" and
```

-continued

```
"r" are distinct characters. In the case of a primary the
following lines may be appropriate:
--------------------------------------------------------------------------------
@R(0000)Registered Republican
@D(0000)Registered Democrat
@G(0000)Registered Green
@I(0000)Registered Independent
--------------------------------------------------------------------------------
COMMENT - "{" begins a line defining an office, issue or
question.
"}" marks the end of that text, followed by codes for
vote counts and restrictions. The symbol # followed by a
number means the voter may vote for no more than that number
of candidates; a negative sign means no write-ins are
allowed. @R means that voters of that type may vote for this
office. No restrictions means any type of voter is
permitted.
"0000 " begins a line listing the count for a candidate (with
optional party affiliation) or one of the possible answers to
a question. Except for the count, this is a line that the
voter actually will see and take action upon.
--------------------------------------------------------------------------------
{President of the United States of America (Democrat)
} #1 @D
0000 William Clinton
0000 Jimmy Carter
0000 Harry Truman
--------------------------------------------------------------------------------
{President of the United States of America (Republican)
} #1 @R
0000 George Bush
0000 Ronald Reagan
0000 Richard Nixon
--------------------------------------------------------------------------------
COMMENT - The voter type codes -@ - also allow a single
computer to handle primaries and situations in which multiple
districts share a polling place. If any type code appears for
any office, the individual voter type is established (using
the keyboard) before voting is enabled.
--------------------------------------------------------------------------------
{Town Council (Democrat)
{        === Vote for as many as 3 ===
}#3 @D
0000 Groucho
0000 Harpo
0000 Chico
0000 Zeppo
0000 Gummo
--------------------------------------------------------------------------------
{Town Council (Republican)
{        === Vote for as many as 3 ===
} #-3       @R
0000 Moe
0000 Curly
0000 Larry
0000 Shemp
--------------------------------------------------------------------------------
{Town Council (Green)
{ === Vote for as many as 3 ===
} #1 @G
0000 Rachael Carlson
0000 Jane Goodall
--------------------------------------------------------------------------------
{Ombudsman
} #1
0000 Gwen Good
0000 Sam Smart
0000 Wendy Wise
--------------------------------------------------------------------------------
{Question 1: Should Article I, section B, of the State
{Constitution be amended to read . . .
}#-1
0000 Yes
0000 No
--------------------------------------------------------------------------------
COMMENT - The last line of each .BAL file is reserved to show
the total number of votes cast and must be exactly like this:
0000 Votes Cast
```

EXAMPLE II

```
--------------------------------------------------------------------------
PRID 13             Precinct 13
Possible types of voters:
--------------------------------------------------------------------------
@D(0000) Registered Democrat
@R(0000) Registered Republican
@G(0000) Registered Green
@I(0000) Registered Independent
--------------------------------------------------------------------------
Offices and candidates (or Questions and Yes/No answers):
--------------------------------------------------------------------------
{President of the United States of America (Democrat)
} #1 @D
0000 William Clinton
0000 Jimmy Carter
0000 Harry Truman
--------------------------------------------------------------------------
{President of the United States of America (Republican)
} #1 @R
0000 George Bush
0000 Ronald Reagan
0000 Richard Nixon
--------------------------------------------------------------------------
{Town Council (Democrat)
{       === Vote for as many as 3 ===
} #3 @D
0000 Groucho
0000 Harpo
0000 Chico
0000 Zeppo
0000 Gummo
--------------------------------------------------------------------------
{Town Council (Republican)
{       === Vote for as many as 3 ===
} #-3 @R
0000 Moe
0000 Curly
0000 Larry
0000 Sherup
--------------------------------------------------------------------------
{Town Council (Green)
{ === Vote for as many as 3 ===
} #3 @G
0000 Rachael Carlson
0000 Jane Goodall
--------------------------------------------------------------------------
{Ombudsman
} #1
0000 Gwen Good
0000 Sam Smart
0000 Wendy Wise
--------------------------------------------------------------------------
{Question 1: Should Article I, section B, of the State
{Constitution be amended to read . . .
}#-1
0000 Yes
0000 No
--------------------------------------------------------------------------
0000 Votes Cast
--------------------------------------------------------------------------
```

Comparing EXAMPLE I and EXAMPLE II above of a ballot file for a primary election shows how simple, yet versatile, the structure is. The only lines that define this ballot are the ones beginning with @, {, }, or 0. The rest simply make the file more easily understood by humans.

For a primary, usually there is more than one party selecting candidates. In this example there are three different parties having primaries. In addition, any registered voter (of any party or none) is allowed to vote for the Ombudsman. The symbol consisting of "@" plus another character uniquely identifies the voter's party and consequently which pages of the ballot that voter can see. Multiple party primaries can be merged into a single ballot on a single machine, but voters will not be confused by seeing candidates or issues for which they are not allowed to vote.

The actual voting process is described below.

Before the first voter appears, and in between voters, the computer screen displays (in digits large enough to be seen across a room) the total number of voters who have used the machine thus far. This enables voting officials to verify at a glance that no unauthorized votes have been cast. Additional information for voting officials may include the amount of disk space remaining, the minimum number of additional voters who could fill the diskette if they used write-in votes wherever possible, and the computer's time-of-day clock. In very extreme cases it may be possible to fill a diskette with write-ins, requiring voting officials to close out one diskette and start a fresh one. Incorrect clock time could indicate some type of tampering with the computer.

In the case of a primary election with multiple voter types, it is necessary for an election official to use the keyboard to select the correct voter type, while holding down the permission button. The voter then verifies that selection before proceeding to the distinctive start-vote screen. In the case of a general election where all voters have the same status, the voting official simply presses the permission button after the voter has pressed a key to indicate readiness to begin. Then the distinctive start-vote screen appears.

It is possible for a voter to complete a voting session (without write-ins) by using only three keys on the keyboard; for instance, [Y], [spacebar] and the down-arrow [↓]. These three can be distinctively marked, perhaps with colored stickers, to make them easy to find. The [Y] would be used exclusively for the voter to indicate "Yes" on the very distinctive screens asking if the voter is really ready to start voting and really ready to stop voting. Those screens sharply define the beginning and end of one person's voting. During voting, each press of the down-arrow [↓] moves a large cursor down through the ballot to the next candidate or the next office or question. At the end of the ballot, any indication that the voter is not done will restart the cursor at the first office on the ballot. The [spacebar] is used to select the candidate or answer currently pointed to by the cursor. In special cases, the [spacebar] may represent approval of an option indicated on the screen. For instance, when the end of the ballot is reached, the voter may be offered the choice of proceeding to record votes for all the selections marked, or cycling back to review and possibly change any selections. Where there are too many options to fit on the screen, the list is scrolled. In these cases, repeated down-arrows will not proceed automatically to the next office. It is necessary to move the cursor down to a special bottom line, and then press the spacebar, effectively "selecting" to proceed to the next office.

Of course, much more keyboard control of the process is possible. The [spacebar] also will "unselect" a previously selected candidate (remove the selection mark), so vote choices can be changed at any time before being made final. As is intuitively obvious to most, the up-arrow [↑] moves the cursor upward. The [PgUp] and [PgDn] keys jump to the previous or next office instead of just moving up or down one candidate at a time. The [Esc] key jumps directly to the final ballot check. It is even possible to enter a page number and jump directly to that page of the ballot. Write-ins naturally permit use of all the alphabetic keys.

Wherever write-ins are allowed, the list of candidates for that office will include a blank line appropriately labeled. When the cursor is on that line, either the [spacebar] or a letter key will begin entry of a write-in name. Completion of that name automatically marks it as selected, and that name becomes a candidate equivalent to any of the preregistered names. It can be unselected later. (It also can be replaced, so no write-in is final until the entire ballot is ended and recorded.) If more write-ins are possible for this office, a new blank line now appears at the bottom of the list.

In summary: the voter confirms beginning the voting process, scrolls through the ballot (linearly, repeatedly, with reversals or with jumps), selects the desired candidates, and confirms readiness to end the voting process and record all selections. The software will not allow completion with overvotes, and warns of (but allows) undervotes.

The following examples represent several "screen capture" frames set off between double lines showing what voters would see as a result of the primary ballot file shown above. Judicious use of color and brightness can make each screen even easier to read than it appears in these black-on-white examples. The unused portion of each screen is not shown.

EXAMPLE III

This example shows what would be seen by a Democrat voter, who has selected a presidential candidate (Carter).

```
================================Top of screen
                                        p. 1 of 4
President of the United States of America
-- Use the up and down arrow keys to point, and the
[spacebar] to select or unselect
          William Clinton
     ))))  Jimmy Carter
          Harry Truman
________________________(blank line for typing a write-in)
================================Bottom of screen
```

Pages 2, 3, & 4 which would follow page 1 above allow voting for the Democrats for town council, for the ombudsman, and for the constitutional amendment.

EXAMPLE IV

This example shows what would be seen by a Republican voter, who has selected two candidates for president. The voter cannot proceed until at least one candidate has been "unselected".

```
================================ Top of Screen
                                        p. 1 of 4
President of the United States of America
OVERVOTE Use the up and down arrow keys to point, and the
     [spacebar] to select or unselect
     ))))  George Bush
          Ronald Reagan
     ))))  Richard Nixon
________________________(blank line for a write-in)
OVERVOTE -- Unselect one or more candidates
================================ Bottom of screen
```

Pages 2, 3 & 4 which would follow page 1 above allow voting for the Republicans for town council, for the ombudsman, and for the constitutional amendment.

EXAMPLE V

This example shows what would be seen by a Republican voter preparing to select town council candidates. Note that the #-3 in the ballot file means that up to 3 votes may be cast, but write-ins are not allowed.

```
==================================Top of screen
                                   p. 2 o 4
Town Council
=== Vote for as many as 3 ===
     -- Use the up and down arrow keys to point, and the
     [spacebar] to select or unselect
     Moe
     Curly
     Larry
     Shemp
==================================Bottom of Screen
```

EXAMPLE VI

This example shows what would be seen by a Green voter, who had specified three write-in candidates.

```
==============================Top of screen
                                   p.1 of 3
Town Council
=== Vote for as many as 3 ===
-- Use the up and down arrow keys to point, and the
[spacebar] to select or unselect
          Rachael Carlson
          Jane Goodall
     )))) _MYSELF
     )))) _MY WIFE
     )))) _MY DAUGHTER
==============================Bottom of screen
```

Since there are no Green candidates for president, this voter sees only three different screens of choices—this one, the one for ombudsman, and the one for the constitutional amendment.

EXAMPLE VII

This example is seen by a Democrat or Republican voter who failed to vote for either town council or ombudsman.

```
================================Top of screen
Checking for overvotes (too many) and undervotes (not all
selected) . . .
Undervote @p.2:          Town Council
Undervote @p.3:          Ombudsman
Counted 2 undervote(s) -- places where you may add votes if
          desired.
To review or change your selections, press the [spacebar].
To leave your selections as they are, press the down arrow
          key.
============================Bottom of screen
```

EXAMPLE VIII

This is a simple example of a general election ballot file.

```
------------------------------------------------------------------------
GEND13                         District 13
  Party identification for candidates:
------------------------------------------------------------------------
```

-continued

```
%D=Democrat
%R=Republican
%G=Green
%r=Reform
---------------------------------------------------------------------------
Offices and candidates (or Questions and Yes/No answers) :
---------------------------------------------------------------------------
{President and Vice-president of the United States of America
} #1
0000 Harry Truman and Alben Barkley     (%D)
0000 Richard Nixon and Spiro Agnew      (%R)
0000 Joe Steel and Joe MacKarthie       (%r)
---------------------------------------------------------------------------
{Town Council
{=== Vote for as many as 3 ===
} #3
0000 Groucho              (%D)
0000 Chico                (%D)
0000 Gummo                (%D)
0000 Moe                  (%R)
0000 Larry                (%R)
0000 Shemp                (%R)
0000 Rachael Carison      (%G)
0000 Jane Goodall         (%G)
0000 Gary Greene          (%G)
0000 Boris Natasha        (%r)
---------------------------------------------------------------------------
0000 Votes Cast
---------------------------------------------------------------------------
```

The above example of a ballot file for a general election shows how simple, yet versatile, the structure is. The only lines that define the ballot are the ones beginning with %, {, }, or 0. The rest simply make the file more easily understood by humans.

For a general election, usually there is more than one party offering candidates for each office. In this example there are four different parties with candidates in one or both races. Unaffiliated candidates also are possible. The short code for each party ("%" plus another character) is used to identify candidates for straight-party votes. It assures that the party name is spelled the same every time. It also reduces the amount of typing necessary to prepare a ballot, and the disk space necessary to store it.

The Examples which follow are two "screen capture" frames representing what voters would see as a result of the general ballot file shown above. If straight-party voting is allowed, the first voting screen seen is Example IX.

EXAMPLE IX

```
===================================Top of screen
STRAIGHT-PARTY VOTE -- OPTIONAL
If you choose to select one of these party names,
every candidate nominated by that party will be selected now.
(You may un-select any of them later.)
-- No party. Select this line to skip straight-party voting.
Democrat
Republican
    Green
    Reform
===================================Bottom of screen
```

EXAMPLE X

This example represents the screen seen by a voter who has selected Truman and Barkley.

```
=================================== Top of screen
                                      p. 1 of 2
President and Vice-President of the United States of America
-- Use the up and down arrow keys to point, and the
[spacebar] to select or unselect.
))))  Harry Truman and Alben Barkley     -- Democrat
      Richard Nixon and Spiro Agnew      -- Republican
      Joe Steel and Joe MacKarthie       -- Reform
__________________________(blank line for typing a write-in)
=================================== Bottom of screen
```

EXAMPLE XI

This example represents the screen seen by a voter who has entered three write-ins, but has unselected two of them. The voter can unselect, reselect or replace any write-in name.

```
============================== Top of screen
                                  P. 2 of 2
Town Council
=== Vote for as many as 3 ===
-- Use the up and down arrow keys to point, and the
[spacebar] to select or unselect
))))  Groucho              -- Democrat
      Chico                -- Democrat
      Gummo                -- Democrat
      Moe                  -- Republican
      Larry                -- Republican
      Shemp                -- Republican
      Rachael Carlson      -- Green
      Jane Goodall         -- Green
))))  Gary Greene          -- Green
      Boris Natasha        -- Reform
      _WRITE IN ONE
))))  _WRITE IN TWO
      _WRITE IN THREE
============================== Bottom of screen
```

Figure 2:
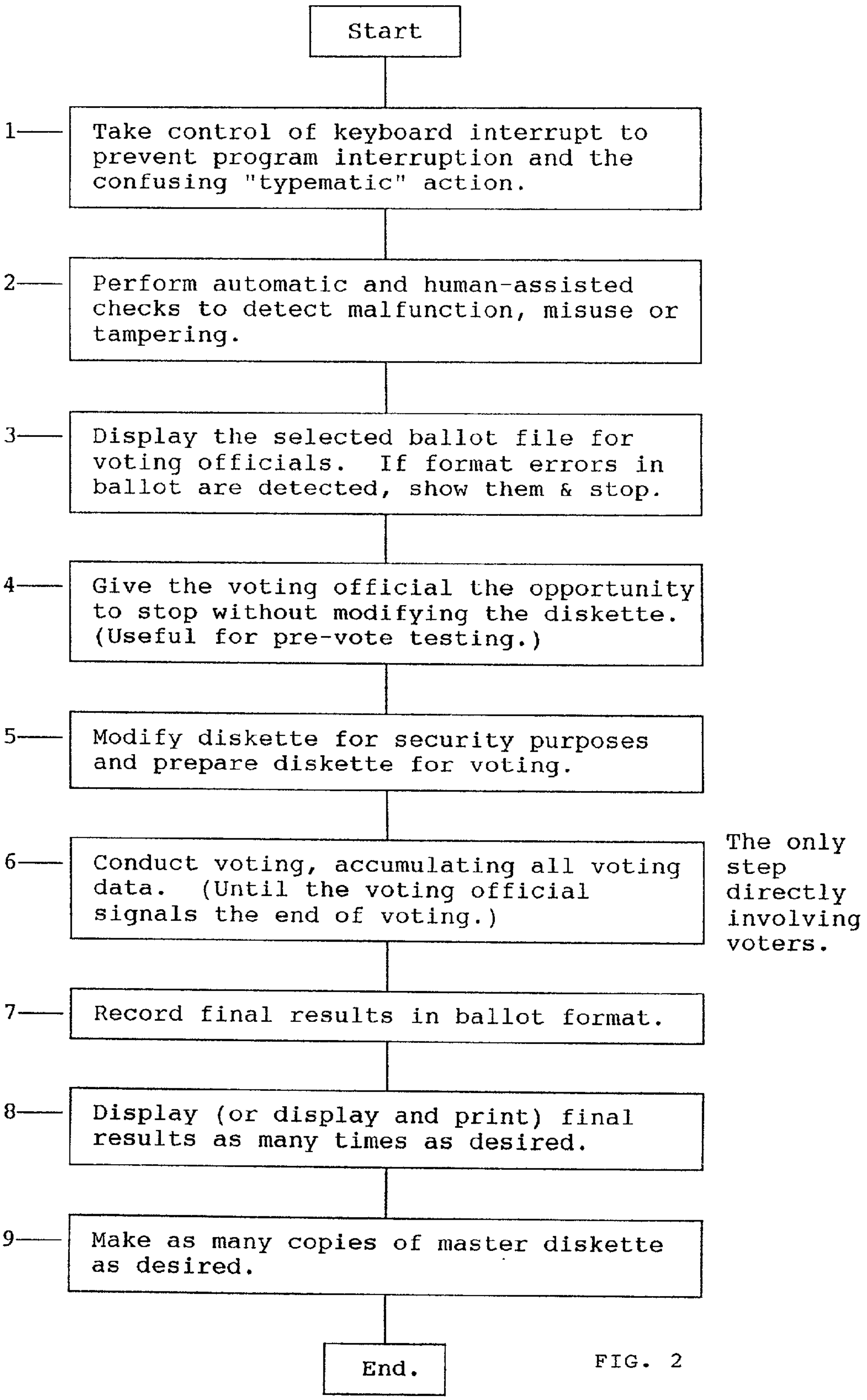
FIG. 2 is a block diagram of the major software processes of the preferred embodiment of the invention.
Figure 3:
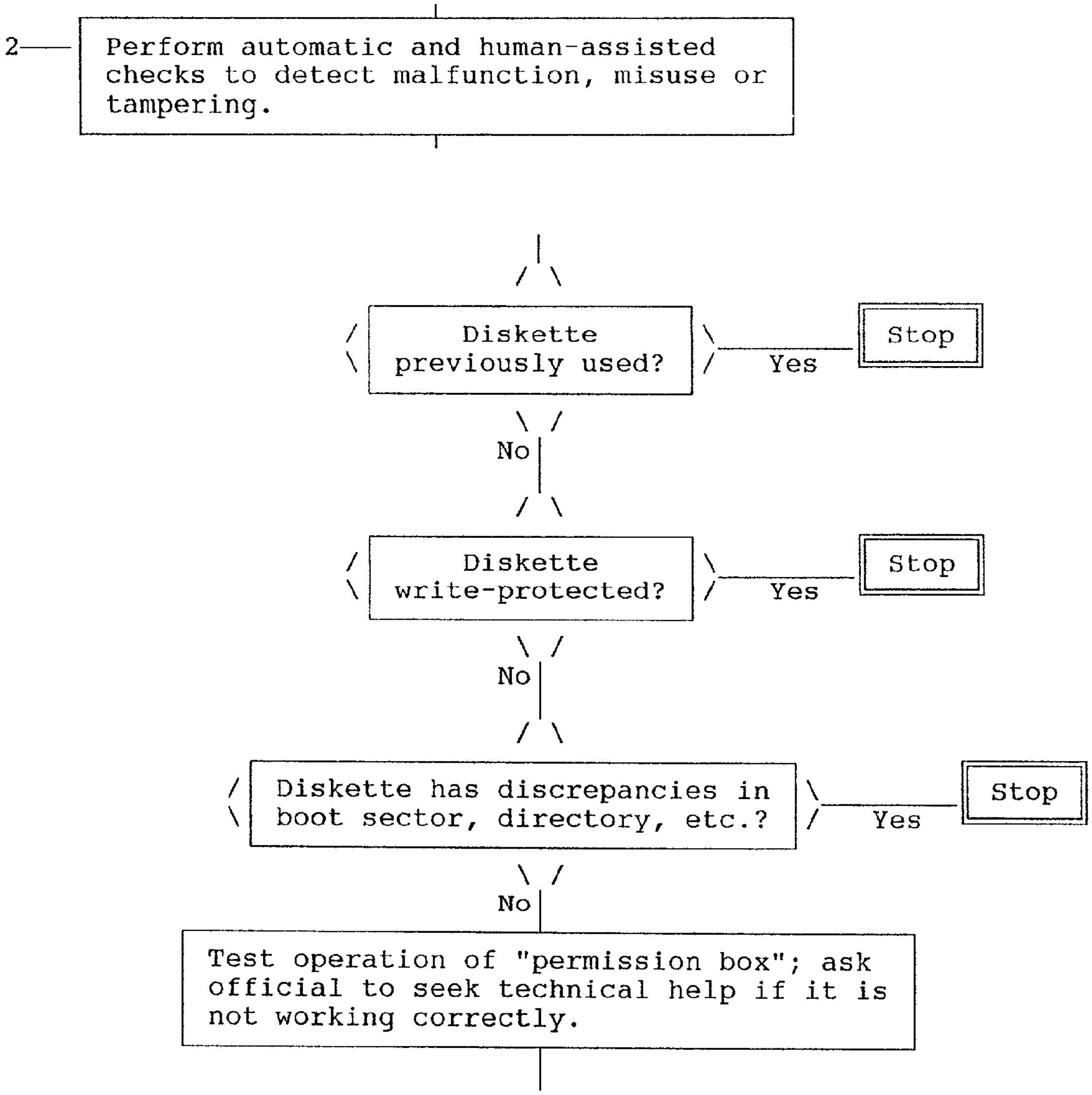
FIG. 3 is a block diagram providing more detail on Step 2 of FIG. 2 (checking).
Figure 4:
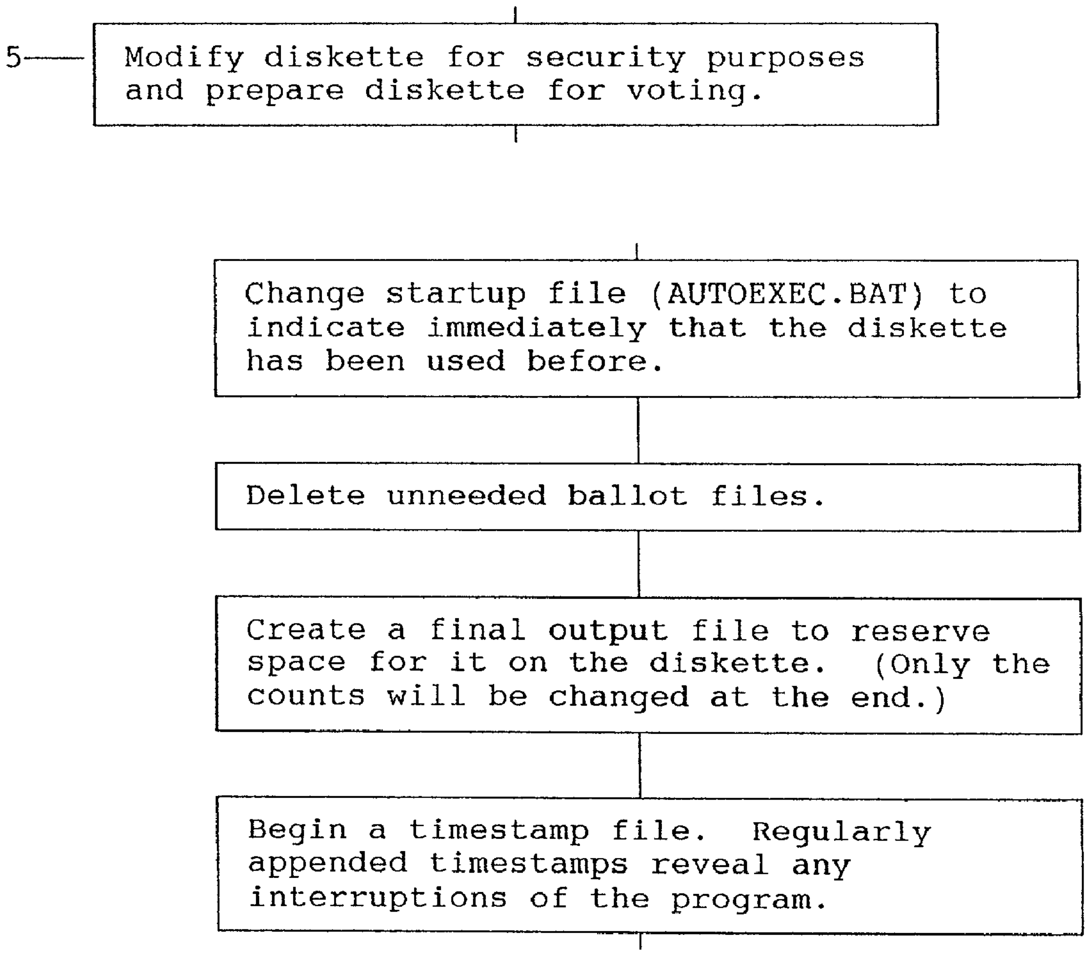
FIG. 4 is a block diagram providing more detail on Step 5 of FIG. 2 (diskette changes).
Figure 5A:
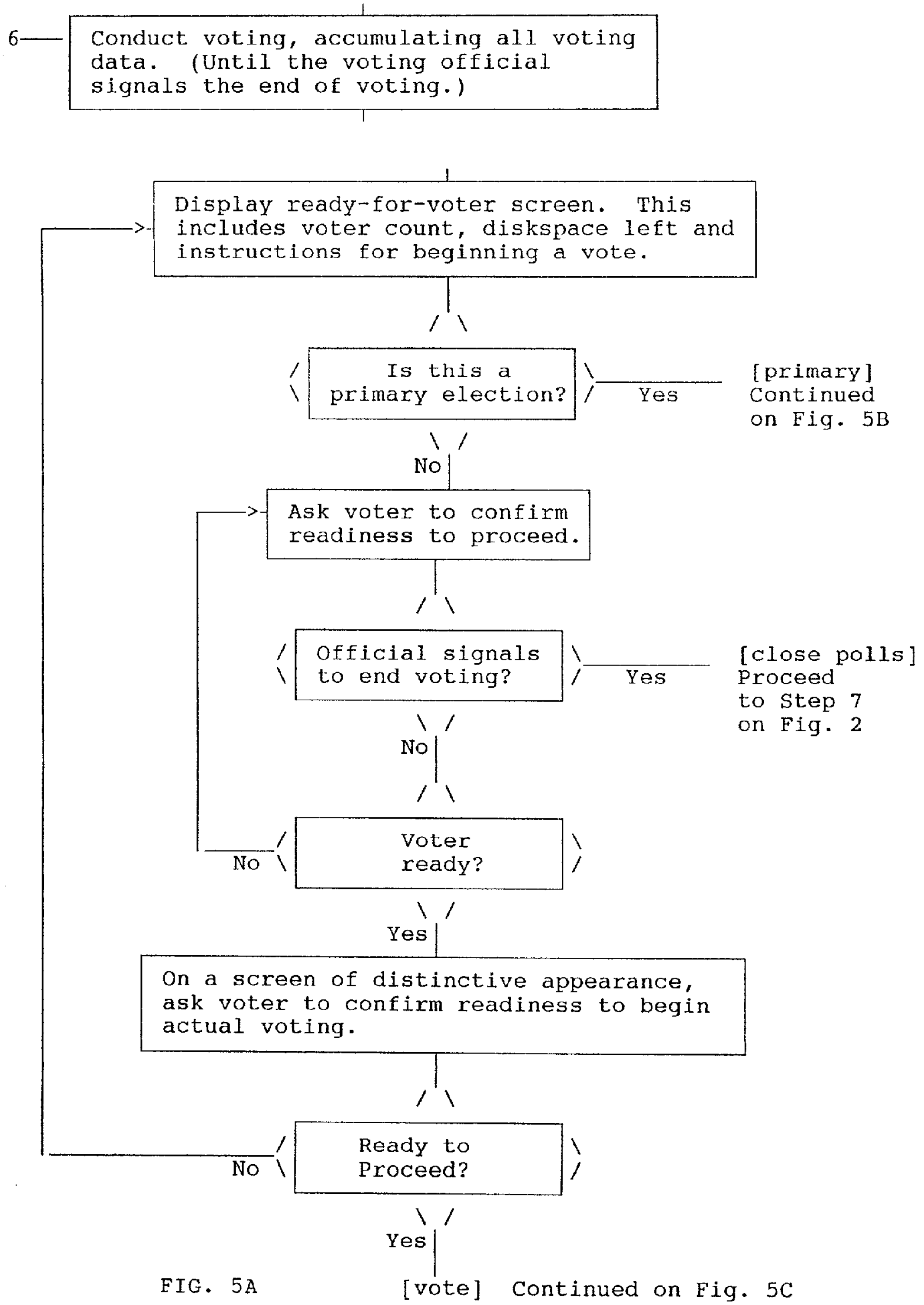
FIGS. 5A, 5B, and 5C are block diagrams providing more detail on step 6 of FIG. 2 (voting).
Figure 5B:
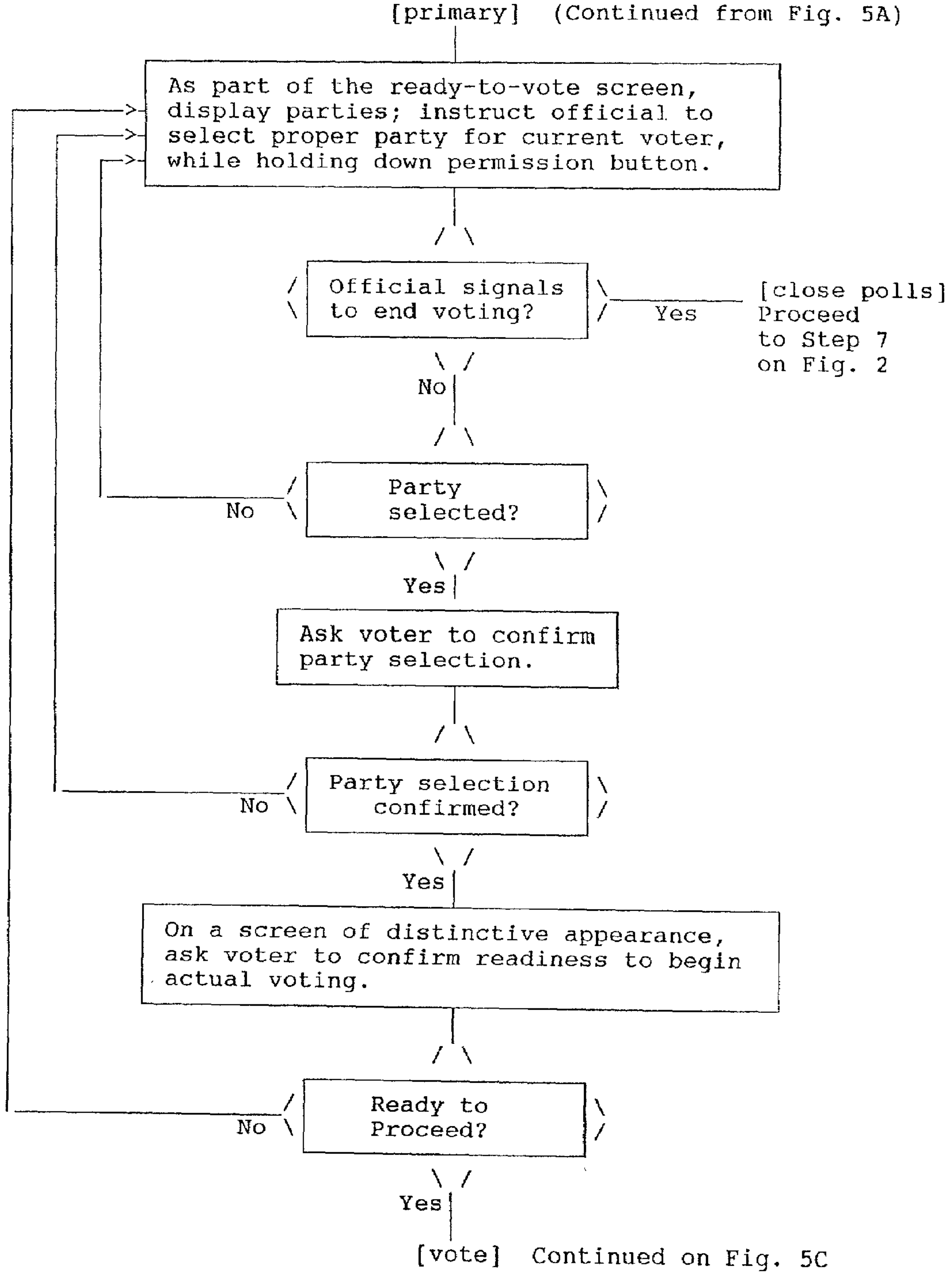
Figure 5C:
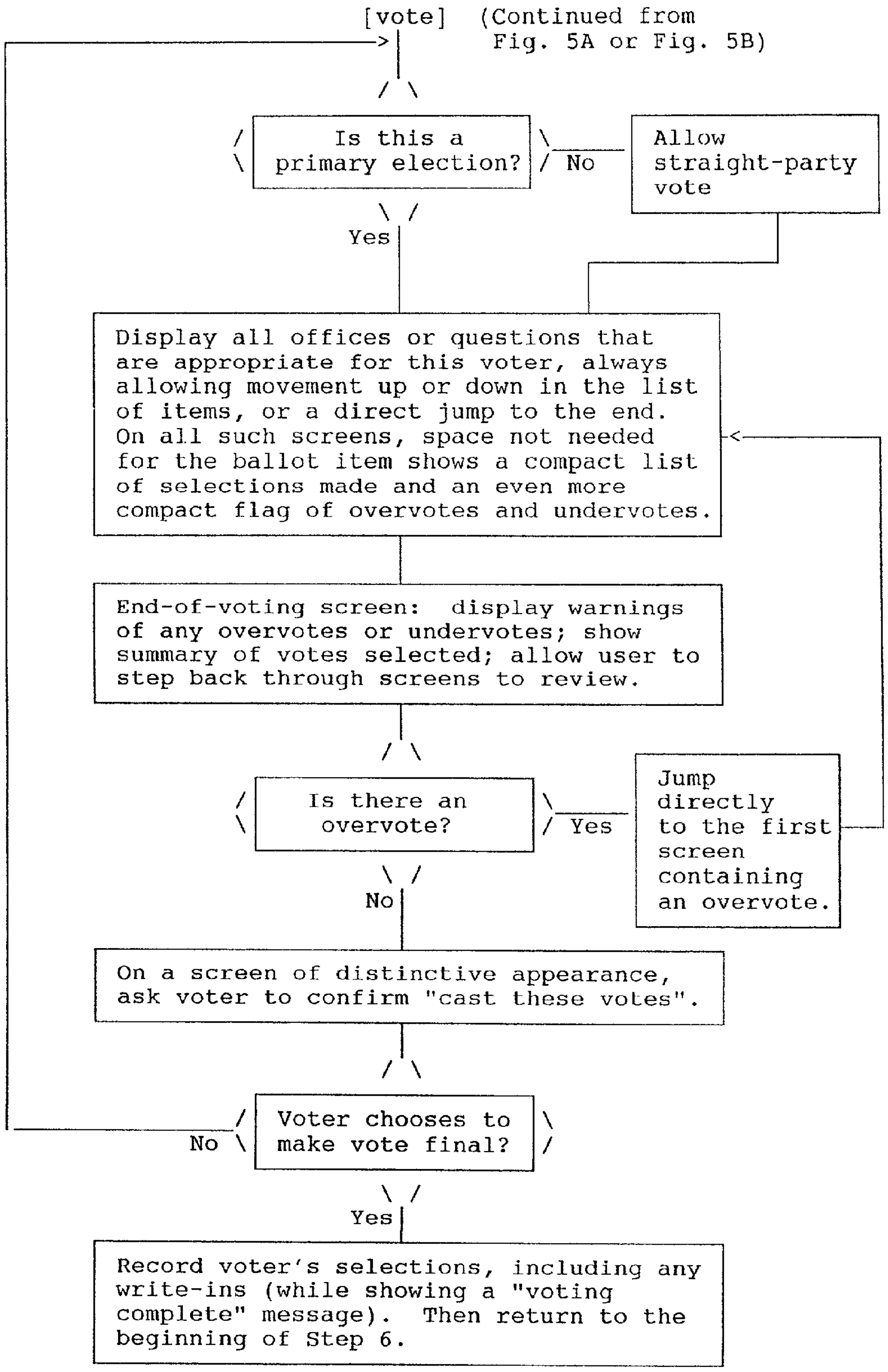

The voting system software (which can be in some combination of .BAT, .COM and .EXE files if DOS is the operating system) operates the computer to perform the processes specified in FIG. 2 which has numerically labeled steps and is elaborated upon in FIG. 3 through FIG. 5. One of the earliest steps (1) is to take control of the keyboard to block key combinations that could interrupt the program and to prevent key repetition that could confuse a voter. For purposes of security and reliability, the software performs a number of self-checks and human-assisted checks upon starting (step 2). Those checks include reading and displaying the ballot file (step 3). The diskette is not modified at all until such checks are complete. When the operator accepts a warning (step 4) that to proceed will begin the one-time use of the diskette, files immediately are automatically changed in a way to prevent accidental reuse of the diskette later (step 5). In step 5 unnecessary ballot files are deleted, and files are created to save voting results.

After the diskette is initialized for data output, the system is ready to begin the actual voting process (step 6). Using the restricted access input (permission box 14), a voting official authorizes each new voter to begin. In the case of a primary, the official may also need to identify the voter's party as part of that authorization process. The voter must make a very clear response on a very distinctive screen in order to actually begin voting.

The voter is presented with a single office or question at a time, along with candidates or choices and possibly one or more write-in lines. The voter may move up and down through the entire ballot, changing votes as often as desired. Completing a vote is a two-stage affair.

A. Reach end-of-ballot checking from the last ballot item or by a direct jump. If any item has too many votes, the voter is warned and redirected to the mismarked office or question. The voter is not allowed to leave an overvote. Otherwise, the system proceeds to stage B.

B. Confirm desire to end voting. If any item has fewer votes than are allowed, the voter is informed of that fact, and is advised that it is possible to go back to review the selections. Even if there are no undervotes, the voter still is advised that it is possible to go back to review the selections. The decision to end voting must be confirmed by a very clear response similar to that given when starting voting. The alternative at this stage is to go back to reviewing choices again.

After the completed vote is added to data files, the cycle repeats for the next voter.

Voting data is saved in triplicate to assure reliability. Counts for pre-defined candidates and questions are saved in one set of continually modified files; write-in votes are accumulated in another set of files.

After the polls close, a voting official must make a very deliberate action to leave the voter loop and proceed to summary output (step 7). At this point counts (and write-ins) can be displayed or printed as many times as desired (step 8). Final instructions to the officials include how to make copies of the diskette for back-up and distribution purposes (step 9).

Figure 6:
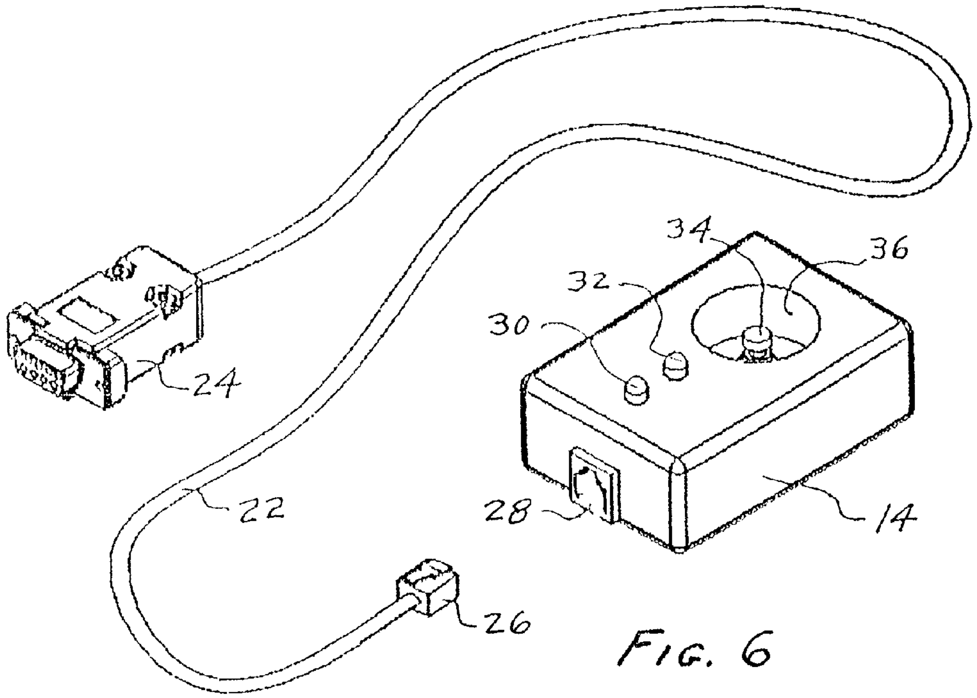
FIG. 6 is a perspective view of the preferred embodiment of the permission box of the present invention and its connecting cable.
Figure 7:
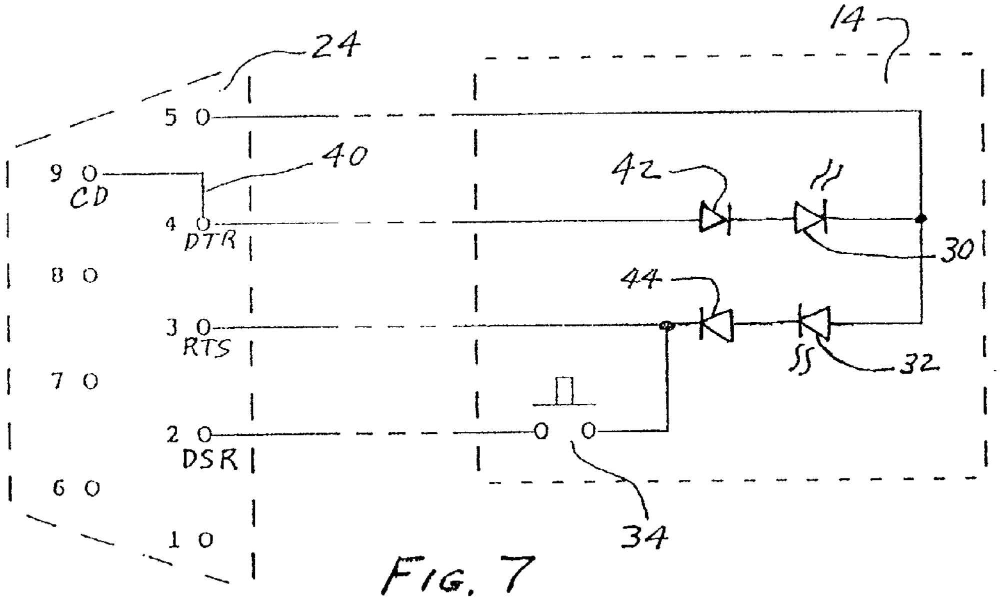
FIG. 7 is a schematic diagram of the preferred embodiment of the permission box of the invention and the serial port connector.

FIGS. 6 and 7 show permission box 14 that helps the personal computer function as a voting system by providing to the software an input signal that is inaccessible to the voter. This corresponds to the button on the side of a mechanical voting machine, that must be pushed by an election official to enable the machine for each new voter. The button on a computer mouse could serve that function, but mice and mouse drivers are not standard. The voting software is simpler with a standard electrical device providing that input signal. In addition, such a standard electrical device provides status signals to the election official, when the computer screen is not visible.

Permission box 14 provides a well-defined and easily interpreted input signal to the software program and status indicating signals back to the election officials from a device located apart from the normal screen and keyboard. To accomplish this, permission box 14 provides one input signal and two status signals using only four wires, so that standard four-wire telephone extension cable can be used to permit the permission box to be located as far as desired from the computer. It should be obvious that additional wires could carry additional signals, but extension cables with more than four wires are not as readily available, and are appreciably more expensive.

The invention also provides a software-testable indication that the connector for permission box 14 is plugged into the computer. Permission box 14 also uses a standard serial port for connection to the computer, avoiding possible interference with use of a printer, and is constructed to prevent accidental activation of the permission signal. The serial port on most personal computers has nine pins, and although some serial ports have 25 pins, readily available adapters can convert them to the current nine pin standard. Of those nine pins, one is a ground or common line, at least two can be controlled by the computer (to carry a voltage either well above or well below ground), and at least two can be sensed by the computer.

The preferred embodiment of the present invention uses an adapter at the computer which converts the standard 9 pin "D" connector to a standard 4 wire telephone jack. A telephone cord of any length can then be connected to permission box 14 which has a standard 4-wire female telephone style connector, two LEDs, a momentary contact pushbutton and some diodes. Because of a deliberate short within the 9-pin connector between one of the controlled lines and one of the sense lines, the software can detect when the 9-pin connector is attached to a serial port. In the preferred embodiment, one controlled line turns on one of the LEDs when high; a second controlled line turns on the second LED when low; and the pushbutton pulls a sense line high if pressed when that second controlled line is high.

The preferred embodiment indicates presence of the permission box even if the telephone-style connectors are not coupled. However, if a cable with at least five wires is used, the deliberate short can be moved to the permission box, which permits the software to detect when both ends of the cable are connected. The pushbutton or other type of switch is protected against accidental activation by being recessed or guarded or redundant. It should be extremely unlikely or impossible to activate the switch accidentally by resting something on the permission box, by trapping the box between two objects, by setting the box down improperly, or by dropping the box from table height to the floor.

When a personal computer is powered up, all serial port outputs (controlled lines) are initialized to low voltage. The preferred embodiment of the permission box then has one LED off and one LED on. The first LED, that is initially off, is switched on to show that the software is running and that the permission box remains properly connected. The second LED is used to indicate some other status, such as when a voter is using the system.

The permission box described here, although extremely simple, is quite versatile. It can be made very rugged, and significant amounts of information can be transmitted via two LEDs. Two bulbs give four combinations of on and off. If an LED can be off, on steady or blinking, there are now nine possible combinations. If the blinking is subdivided into fast and slow blinking, sixteen combinations become possible. Alternate blinking versus blinking in unison further increases the possibilities. Numbers can be communicated by the number of blinks in a series. Then there is Morse code. The single button also can be used to provide multiple control options. Mouse users know about single-click versus double-click. With appropriate software, choices can be made by pressing the button after the first, second or third LED flash in a series, or when cyclic hi-lighting illuminates the correct choice on a screen.

Referring to the drawings, FIG. 6 shows the preferred embodiment of remote permission box 14 for personal computer 10. Connecting cable 22 interconnects central processing unit 11 with permission box 14. Cable 22 is a standard 4 wire telephone cable with male modular style plugs on both ends. Serial port adapter 24 has a telephone style female connector (not seen) on its back side. Permission box 14 includes telephone-style female connector 28, LEDs 30 and 32, and momentary contact switch 34 in recess 36.

The telephone style connectors permit any length cable to be used. If it is considered unimportant to separate cable 22 from permission box 14 for storage, the two telephone-style connectors may be eliminated and the cable may be wired directly to the permission box.

FIG. 7 is a schematic diagram of the preferred embodiment of permission box 14 showing one of several possible circuits linking serial port connector 24 to switch 34 and LEDs 30 and 32 within permission box 14. Any two control lines and any two sense lines of the central processing unit could be used, but the preferred embodiment uses control lines DTR and RTS from central processing unit 11 to control LEDs 30 and 32, respectively. Sense line CD of central processing unit 11 is used via short 40 to detect that connector 24 is plugged into a serial port. Sense line DSR detects closure of switch 34 when control line RTS is high. Diode 42, if necessary, protects LED 30 from excessive reverse bias. Diode 44 protects LED 32 from reverse bias without blocking the path for current through switch 34 to sense line DSR.

Assuming that connectors are properly mated:

If and only if DTR is high, LED 30 glows and CD senses a high voltage.

If and only if RTS is low, LED 32 glows.

If RTS is high and switch 34 is closed, DSR senses a high voltage.

In the preferred embodiment, LED 30 and LED 32 are of different colors, and LED 32 has internal circuitry that makes it blink when constant voltage is applied. For applications in which blinking of LEDs is to be software-controlled, LED 32 should not be of the blinking type. Note that LED circuits normally have series resistors to limit current through the LED. For this application series resistors are unnecessary because the serial ports on personal computers are incapable of providing excessive forward current to a typical LED.

Opportunities to tamper with the voting process can be avoided at many levels.

Providing copies of both the starting diskette (or other storage medium) and the final version to news organizations, minority parties and other interested groups makes the process completely public and makes publicly detectable any tampering with software or results before or after the election.

Software can maintain some information in active memory (RAM) to compare with information stored on the diskette. Such information as the latest vote totals, the count of write-ins and the most recent write-ins can be read back from the diskette and compared with the RAM-stored records. Any discrepancy will stop the process and sound an alert.

Restricting physical access to the computer (and especially to the diskette) avoids opportunities for vandals to destroy already-cast votes with magnets, abrasive dust, tools, etc. The degree of restriction may be proportional to the probability of such vandalism. It could be as simple as turning the diskette slot toward a wall or taping a cover over it, or as secure as locking the central processing unit in a closet and running long cables to the display and keyboard. Any such restriction also avoids removal and modification of the diskette.

Sealing the diskette into its drive is as effective as the nature of the seal in exposing (after the fact) any unauthorized removal of the diskette from the drive. (Thus avoiding an opportunity to modify the results.) A locking diskette seal, as described in this invention, certainly can prevent any accidental removal, and adds an easily-understood security element to the process.

Software interaction with the removable storage medium can be even more effective than a physical seal in preventing removal and modification. For example, if the program communicates very frequently with the storage medium, any failure to communicate can cause the program to stop immediately and sound an alert. One form of frequent communication is simply checking that the storage medium exists. Another is the regular recording of timestamps.

In the preferred implementation, the timestamp security file is created at the same time as the result-recording files, and grows by the regular addition of the current time, as well as by the periodic addition of the voter count. This file can be analyzed to confirm that there were no interruptions in the timestamps, that the total voter count matched other records, and that the time between voters was not suspiciously short. Where multiple machines are used in rotation at a single location, timestamp files from different machines can be compared to look for anomalies such as heavy use of one machine overlapping light use of another. Statistical testing of the timestamp files from single or multiple machines can indicate sequences unlikely to occur naturally.

In a placid small town where everyone knows and trusts all the voting officials, and accidental errors in procedure are far more likely than any deliberate tampering, the data-checking steps built into the software probably supply all the necessary security for voting. In an area known for political scandals and questionable elections, it would be advisable to use all the anti-tampering steps mentioned above, and perhaps more.

An example of high-security procedures to assure random diskette distribution is that the master diskette actually used for voting comes from a set of numbered but (supposedly) identical diskettes bound together by something such as a plastic cable-tie strap threaded through their write-protect holes. The diskette to be used is selected by some clearly random and unfakable procedure. For example, it can be to place a quarter, a dime, a nickel and a penny in a clear plastic container, shake and let settle. Starting from one, add one if the penny is heads; add two if the nickel is heads; add four if the dime is heads; add eight if the quarter is heads. Use the resulting sum (1 to 16) as the number of the diskette to be used. (If there are six diskettes, and the number is bigger than six, subtract six and check again.) Attach a long ribbon to the selected diskette through the hole indicating high-density (not the write-protect hole) and seal the ends together. (Keeping the ribbon in sight at all times or even having it held by several people virtually eliminates the possibility of some sleight-of-hand switching of diskettes.) Allow interested parties to attach personalized labels to the diskettes they want. Give first choice to those least closely connected to the voting officials and the party in power, or assure that the sequence of choices is truly random. After all choices have been made, then cut the strap holding the diskettes together, distribute the claimed copies and put the selected master into the computer.

The diskette seal of the invention provides the PC-based voting system with a tampering indicator by sealing a vote-recording diskette into its drive to prevent any tampering or substitution. Previous inventions related to diskette locking have quite different purposes and implementations. U.S. Pat. No. 4,918,952 claims a locking mechanism built into a unique diskette drive. U.S. Pat. Nos. 4,907,111; 5,355,272; and 5,630,330 are intended to block the drive slot to prevent any use of it at all. U.S. Pat. No. 4,907,111 is intended to disable the drive, is comparatively complex, and uses a key lock. None of these previous inventions incorporates means to indicate the diskette has been tampered with and replaced in the drive, and all are comparatively complex.

The present invention provides a diskette sealing system that assures proper security by using a unique, typically numbered, seal requiring destructive removal. This invention works on any 3.5" diskette drive without modification, regardless of the style of computer case in which the drive is mounted and, in a simple and inexpensive way, provides a permanent identification of the specific diskette to which this sealing system is applied.

All ordinary 3.5" diskette drives hold the diskette in place by having the exposed end snap down, once it is completely inside the slot. A push button releases the diskette by forcing it up into alignment with the slot, where a spring (compressed during insertion) pops the diskette out of the slot. If the diskette cannot rise up, it cannot come out.

The present invention seals a diskette into a drive by inserting a blocking plate into the slot above the diskette to prevent it from being lifted up by the ejection button. That blocking plate is held in place by attaching it to the diskette in a way that requires destructive removal of a sealing or locking device. A portion of the attachment system must be cut, torn or broken to separate the blocking plate from the diskette. In the present invention, (1) an extension is adhesively attached to the diskette; (2) the diskette is inserted into the drive; (3) the blocking plate is inserted above the diskette, contacting the extension in some way; and (4) the extension and blocking plate are fastened together.

Referring to the drawings, FIG. 8 shows the components of the preferred embodiment of a system for sealing a specific diskette into a diskette drive. An ordinary 3.5" diskette 50, which is to be sealed into a diskette drive, has a slightly recessed area 52 normally used for a label. A flexible extension 54, typically paper or very light cardboard has a diskette end 56 with corresponding adhesive area 57 on the underside, and a free end 58 with one or more adhesive areas 60 on the underside. Once adhered, the extension itself becomes an identifying label for the diskette. The blocking plate 62, with blocking end 64, opening 66 and anchor end 68, completes the system.

FIG. 9 shows diskette 50, flexible extension 54, and blocking plate 62 assembled as they would be when in a diskette drive. Blocking end 64 of blocking plate 62 slightly overlaps diskette 50, and the two are joined by flexible extension 54. The diskette end 56 of flexible extension 54 is bonded to diskette 50 at recessed area 52 using adhesive area 57 under extension 54. Free end 58 of extension 54 is threaded upward through opening 66 in blocking plate 62, wrapped around anchor end 68, and sealed to itself using adhesive area(s) 60 on the underside of free end 58 to prevent separation of blocking plate 62.

FIG. 10 shows diskette drive 70 of a computer 72 with blocking plate 62 protruding, and flexible extension 54 wrapped around and retaining blocking plate 62.

Figure 11:
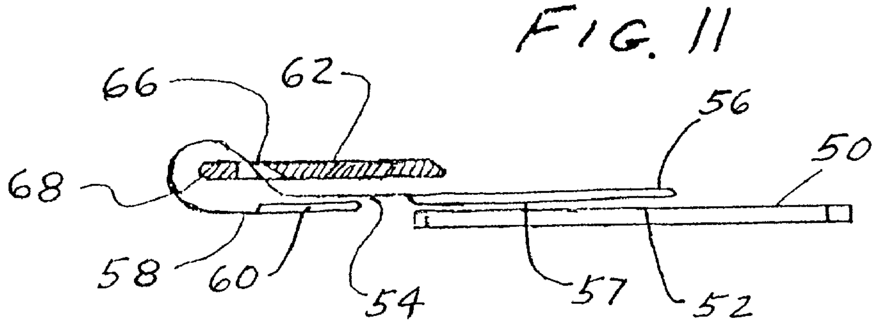
FIG. 11 shows in cross-section view how the extension is attached to the diskette and the blocking plate of the preferred embodiment of the diskette sealing apparatus.

FIG. 11 is a cross section of blocking plate 62, with an exaggerated extension 54 showing the path of extension 54 and the positioning of adhesive areas 60 and 57 on extension 54. In use, adhesive area 57 is exposed by removing or peeling back a protective release paper (not shown), and then the adhesive area is used to bond diskette end 56 of extension 54 to recessed area 52 of diskette 50. Next, diskette 50 is placed into drive 70, with free end 58 of extension 54 extending from drive 70. Blocking plate 62 is then brought close to the drive 70, free end 58 is threaded upward through opening 66, and blocking plate 62 is placed into the slot opening of drive 70, above diskette 50. The remaining release paper is removed from extension 54 to expose adhesive area 60. Extension 54 is then wrapped around anchor end 68 of blocking plate 62 and brought into contact with itself underneath blocking plate 62. Adhesive area 60 located at the very end of free end 58 of extension 54, or near adhesive area 57, or both, enables the free end to bond to itself strongly enough to require destructive removal from blocking plate 62.

Removal of this preferred embodiment of the diskette sealing system requires that extension 54 be cut to release blocking plate 62. A razor blade, knife, or even a fingernail may be used to cut the loop of extension 54 around anchor end 68 and release blocking plate 62.

Figure 12:
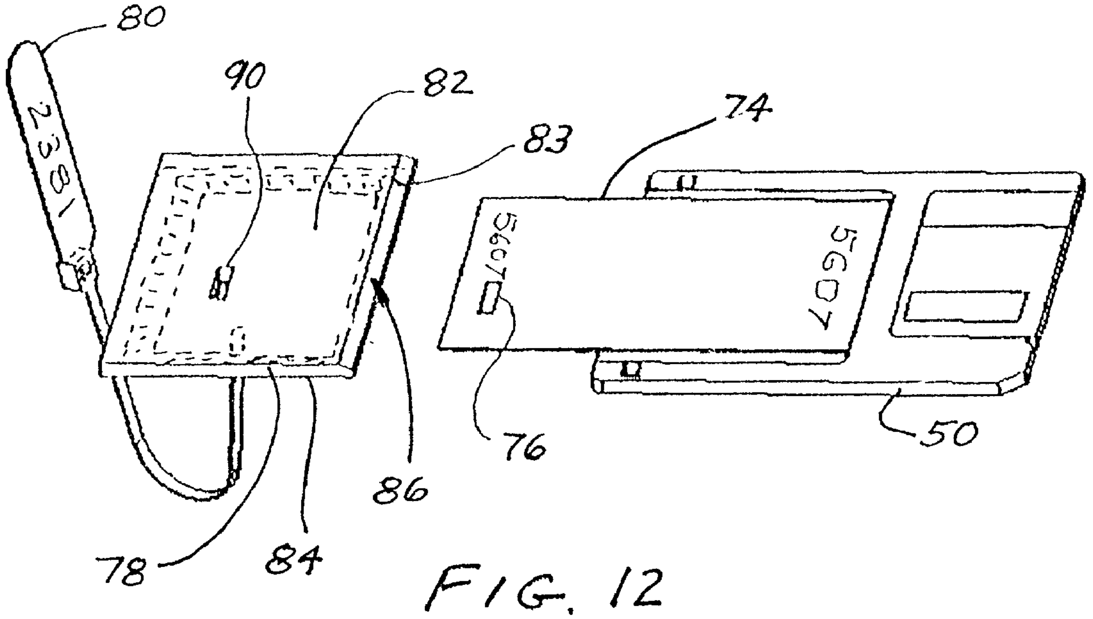
FIG. 12 is an exploded view of an alternate embodiment of the diskette sealing apparatus, showing the diskette with an attached stiff extension, the blocking plate with an extension-receiving cavity, and a numbered seal to lock the other two components together.

An alternate embodiment of a diskette sealing system is illustrated in FIG. 12. This embodiment utilizes a stiff extension 74 instead of the flexible extension 54 of FIG. 11, a different style blocking plate 78, and a separate seal 80 to lock blocking plate 78 to extension 74. In this embodiment, stiff extension 74 has only a single adhesive area to bond it to diskette 50. Extension 74 has a hole or slot 76 for receiving seal 80. Blocking plate 78 has a top plate 82 (that preferably is transparent) With leading edge 83 which overlaps diskette 50 in the drive and a bottom plate 84 (preferably opaque) attached to or integral with top plate 82, and together the bottom and top plates form a cavity 86 for receiving tongue 74. There is a hole or slot 90 through both top plate 82 and bottom plate 84, such that when blocking plate 78 is properly installed over extension 74, holes or slots 76 and 90 align, and seal 80 can be placed through them. Seal 80 can be the plastic "cable tie" style depicted, a numbered metal seal, or any appropriate strap-type seal that can prevent separation of blocking plate 78 from extension 74 until seal 80 is destructively removed. In a variation on this embodiment, larger openings in top plate 82 and extension 74 can allow using an adhesive paper seal to fasten blocking plate 78 to extension 74 and still require destructive removal.

With transparent top plate 82, opaque bottom plate 84, and extension 74 colored or marked to be distinctly different from the bottom plate, it becomes very easy to see when extension 74 and blocking plate 78 are joined properly. Asymmetric placement of holes 76 and 90 assures that the diskette seal cannot be put together upside down.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. Voting apparatus for conducting voting comprising:

a personal computer including a monitor, a keyboard, and a central processing unit conventionally interconnected;

a portable data storage medium that controls all functions of the computer, and within which is stored voting software including an operating system program, executable programs, ballot defining files, and result storage files;

tamper detection means which indicates if tampering with a connection of the data storage medium with the computer has occurred; and permission means for authorizing use of the voting apparatus by each individual voter.

2. The voting apparatus of claim 1 wherein the portable data storage medium is a diskette.

3. The voting apparatus of claim 1 wherein the result storage files are vote counting files.

4. The voting apparatus of claim 1 wherein the permission means is an electrical device interconnected with the computer.

5. The voting apparatus of claim 1 wherein the permission means is an electrical device interconnected with the computer and the electrical device comprises a pushbutton for signaling the computer and two status lights.

6. The voting apparatus of claim 1 wherein the tamper detection means comprises:

a blocking plate inserted into a diskette drive slot of the computer with at least part of the blocking plate inserted on top of a diskette that is already in the diskette drive slot; and attachment means for attaching the blocking plate to the diskette so that removal of the blocking plate from the drive slot destroys a visible portion of the attachment means.

7. The tamper detection means of claim 6 wherein at least part of the blocking plate protrudes from the drive slot.

8. The tamper detection means of claim 6 wherein the attachment means comprises an extension attached to the diskette with a portion of the extension protruding from the drive slot and attached to the blocking plate.

9. The tamper detection means of claim 6 wherein the attachment means comprises an extension attached to the diskette with a portion of the extension protruding from the drive slot and attached to the blocking plate by looping around a part of the blocking plate and being attached to itself.

10. The tamper detection means of claim 6 wherein the attachment means comprises an extension permanently attached to the diskette with a portion of the extension protruding from the drive slot and attached to the blocking plate by the extension being locked into a cavity within the blocking plate.

11. The tamper detection means of claim 6 wherein the attachment means comprises an extension attached to the diskette with a portion of the extension protruding from the drive slot and attached to the blocking plate by the extension and the blocking plate having aligned holes through which a locking fixture is passed.

12. The tamper detection means of claim 11 wherein the locking fixture is a strap formed into a loop which is permanently closed.

13. A method of conducting voting using a personal computer comprising:

connecting to a personal computer a tampering detectable portable data storage medium that controls all functions of the computer, and within which is stored voting software including an operating system program, executable programs, ballot defining files, and result storage files;

taking control of a keyboard interrupt of the computer;

checking for errors on the ballot defining files;

conducting the voting as accumulating vote totals are recorded on the portable data storage medium; and stopping the computer from accumulating any additional votes.

14. The method of claim 13 further including recording final results in ballot format.

15. The method of claim 13 further including displaying final vote totals on a monitor screen of the computer.

16. The method of claim 13 further including printing final vote totals.

17. The method of claim 13 further including performing checks to detect malfunction, misuse, or tampering before the step of conducting the voting.

18. The method of claim 13 further including permitting an election official to stop operation without modifying the portable data storage medium before the step of conducting the voting.

19. The method of claim 13 further including deleting, renaming and adding files in preparation for voting before the step of conducting the voting.

20. The method of claim 13 further including making copies of a master data storage medium after voting is completed.

* * * * *